United States Patent [19]

Clausse

[11] 3,725,643
[45] Apr. 3, 1973

[54] LIQUID HEATING UNITS, CONTROL MEANS FOR SUCH UNITS AND VESSELS INCORPORATING HEATING UNITS

[75] Inventor: Georges Jean Louis Clausse, Laleham, England

[73] Assignee: The Hoover Company, North Canton, Ohio

[22] Filed: Jan. 4, 1971

[21] Appl. No.: 103,525

[30] Foreign Application Priority Data

Jan. 9, 1970   Great Britain..................1,254/70
July 27, 1970  Great Britain.................36,345/70
Oct. 30, 1970  Great Britain.................51,833/70

[52] U.S. Cl. ............219/441, 99/282, 219/331, 219/439, 219/495, 219/518
[51] Int. Cl..............................................F27d 11/02
[58] Field of Search......219/441, 442, 495, 328, 331, 219/430, 437–438, 439, 518; 99/282

[56] References Cited

UNITED STATES PATENTS

| 1,804,130 | 5/1931 | Starr | 219/449 |
| 2,489,560 | 11/1949 | Brown | 219/441 |
| 2,611,069 | 9/1952 | Frazier | 219/518 |
| 2,657,299 | 10/1953 | McNairy | 219/441 |
| 2,834,869 | 5/1958 | Stiebel | 219/441 |
| 2,843,720 | 7/1958 | Young | 219/441 |
| 3,328,561 | 6/1967 | Sakamoto et al. | 219/442 |
| 3,487,200 | 12/1969 | Waller et al. | 219/437 |
| 3,513,292 | 5/1970 | Sano et al. | 219/331 |
| 2,839,661 | 6/1958 | Visos | 219/442 |
| 2,924,699 | 2/1960 | Russell | 219/442 |
| 3,026,402 | 3/1962 | Russell | 219/441 |
| 2,972,038 | 2/1961 | Gomersall | 219/441 |
| 3,539,774 | 11/1970 | Thornton | 219/442 |

FOREIGN PATENTS OR APPLICATIONS

| 218,409 | 7/1924 | Great Britain | 219/441 |
| 1,012,003 | 7/1957 | Germany | 219/449 |
| 1,141,390 | 1/1969 | Great Britain | 219/495 |

Primary Examiner—Volodymyr Y. Mayewsky
Attorney—Alfred G. Gross and James A. Wanner

[57] ABSTRACT

Liquid heating units, specifically for beverage makers and kettles incorporate control mechanism including contacts for controlling an immersible heating element both to switch it off at a predetermined temperature, e.g. boiling, or if the heating element is not fully immersed. The control mechanism includes a thermomagnetic element the magnetic properties of which change at a predetermined temperature to release a magnet previously attracted thereto and which then falls by gravity to open the contacts. The element can be made sensitive to boiling liquid either by a direct heat conduction or by passage of vapor through a vapor tube to the element.

10 Claims, 14 Drawing Figures

INVENTOR
GEORGES JEAN LOUIS CLAUSSE

INVENTOR
GEORGES JEAN LOUIS CLAUSSE

INVENTOR
GEORGES JEAN LOUIS CLAUSSE

LIQUID HEATING UNITS, CONTROL MEANS FOR SUCH UNITS AND VESSELS INCORPORATING HEATING UNITS

This invention relates to liquid heating units, to control means for such units, and to vessels, such as kettles or beverage makers, incorporating such heating units.

Provision has been made in many constructions of electric kettle whereby electric contacts in series with a normally immersed heating element are opened by a bimetallic switch in order to protect the element or a part thereof if it is not immersed.

Other prior proposals have utilized a second pair of contacts which are responsive to steam in order to provide automatic switching-off when the kettle boils. This duplication has lead to complicated arrangements which are both expensive and difficult to assemble. For example in some such prior constructions the wall of the kettle has had to be pierced in several places with consequent sealing problems. Moreover these prior constructions do not permit the simple assembly of an element and its control mechanism into a kettle for replacement purposes. Nor do they permit the conversion of a kettle having an ordinary element, having no switch whatsoever, into one having the dual switching facility of being sensitive to boiling and to failure to maintain the element fully immersed.

It is accordingly a principal object of the present invention to provide a configuration of heating unit in which the heating element and its control mechanism, the latter preferably having the dual switching facility referred to above, are formed in a unitary manner whereby the unit can be simply assembled in a single aperture in a kettle wall and clamped thereto by a simple clamping ring without any electrical work being required.

Thus according to one aspect of the present invention a liquid heating unit comprises a submersible electric heating element having a unitary head which is adapted to be secured within an aperture in a wall of a liquid container, the head having means thereon for connection to a mains supply, control mechanism being provided within the head for moving control contacts for the heating element from a first to a second relative position, the mechanism incorporating a heat sensitive member which, when the head is mounted in the aperture in the said wall is adapted to cause such actuation of the contacts on the one hand if the liquid reaches a predetermined temperature and on the other hand if a part of the element is not covered by liquid, the contacts being returnable from the second to the first position by manual operation.

A heating unit of this type can, in contrast to many prior constructions, be readily replaced by removal through the filling opening in a vessel and replaced by a similar unit. Alternatively a conventional unit having no control mechanism can be substituted by a heating unit according to the invention.

According to a specific aspect of the present invention a liquid heating unit comprises a submersible electric heating element adapted to be secured within a liquid container, with a unitary part of the unit, referred to as the head, adapted to extend through an aperture in a container wall and be secured in sealing relationship with the margin of the aperture, the head incorporating a chamber within which a control mechanism for the heating element is at least partially situated, the control mechanism including electrical contacts adapted to be actuated by relative movement between a magnet and a ferrite element, the said relative movement being arranged to occur upon heating of the ferrite element to a predetermined temperature. The term ferrite element as employed herein and in the claims is to be construed as a thermo-magnetic element of ferro-magnetic material such as for example certain nickel iron alloys, which is ferro-magnetic at temperatures below the Curie point and diamagnetic at temperatures above this point. Such material is thus capable of being attracted by a magnet at temperatures below the Curie point but is scarcely or not at all attracted at temperatures above this point. It has been found that by the selection of an alloy having a suitable Curie point temperature, and because of the sudden change in magnetic properties at this temperature, consistent, reliable and accurate control of mechanisms incorporating such ferrite elements can be achieved.

The magnet is conveniently arranged to be moved between first and second positions, in the first of which it is attracted towards or in contact with the ferrite element, and in the second of which it actuates the electrical contacts. The magnet in the second position preferably actuates the contacts at least partially in a magnetic manner, for which purposes a keeper may be provided to which the magnet is attracted in moving to the second position, although partial or complete actuation of the contacts by a positive actuation is not precluded. The magnet is preferably adapted to move away from the ferrite element when the latter is above its Curie temperature at least partially by gravity so that springs or the like are avoided in this configuration.

The invention may be carried into practice in a number of ways but several specific embodiments will now be described by way of example with reference to the accompanying drawings in which.

The various embodiments of the invention illustrated all include a magnet which is in use released from a ferrite element which, as previously defined, is a material of a temperature sensitive ferro-magnetic type. The ferrite element becomes non-magnetic or substantially non-magnetic at a predetermined temperature to enable the magnet to move from one position to another position to open contacts normally in series with the heating element of the appliance within which the control mechanism is incorporated, thus stopping the heating of the liquid and/or protecting the heating element when by accident the heating element is not covered by liquid.

Figure 1:
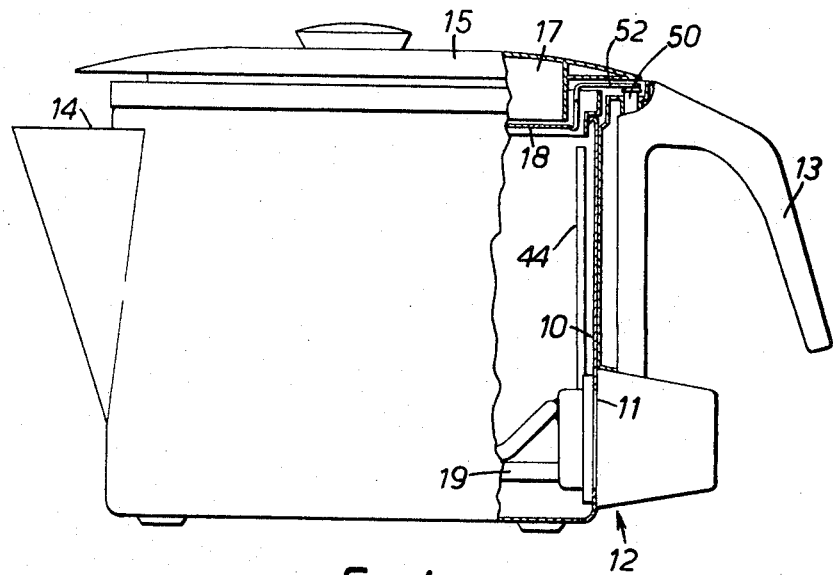
FIG. 1 shows a beverage maker with certain parts in cross section to show a heating unit in accordance with the invention.
Figure 2:
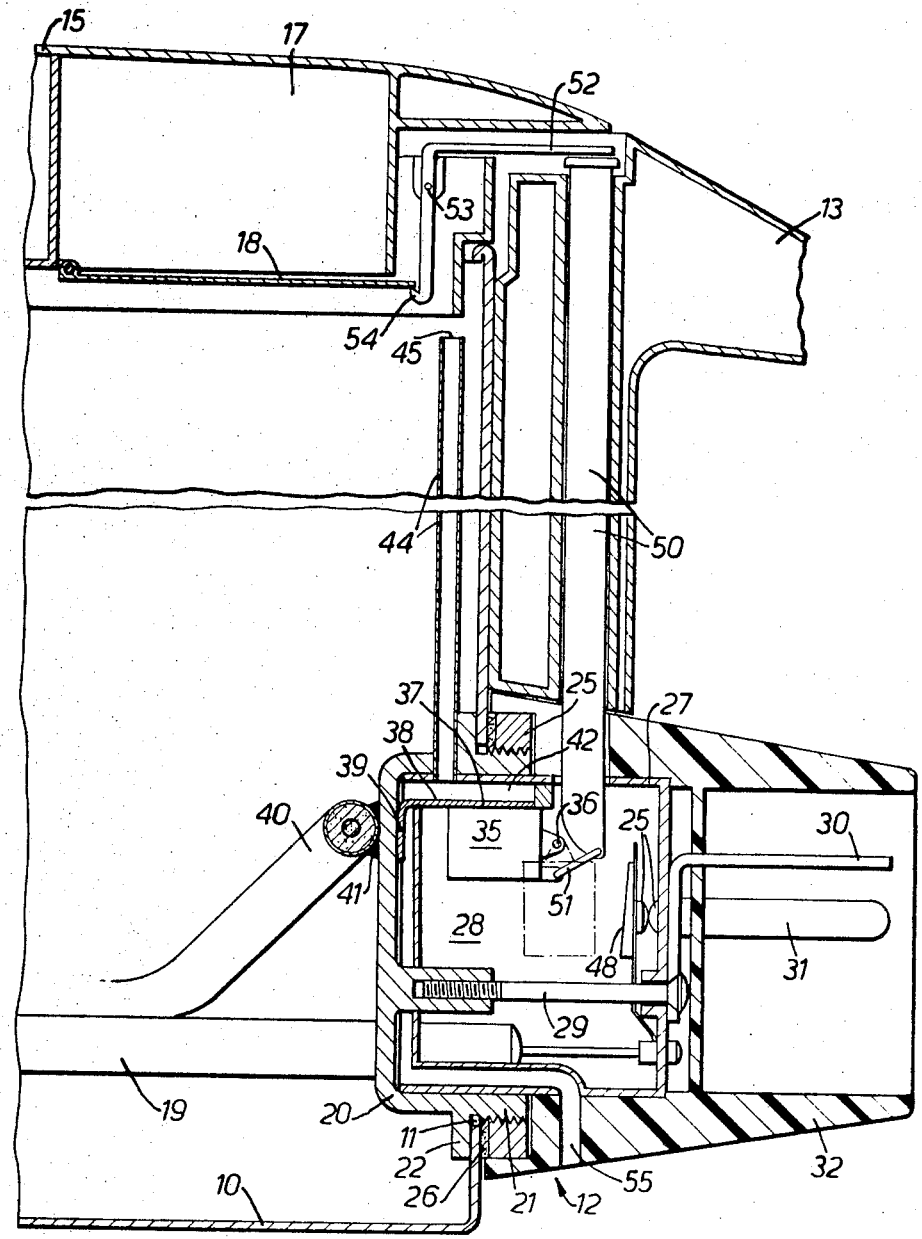
FIG. 2 is a sectional elevation of the control mechanism incorporated in the beverage maker of FIG. 1.

FIG. 1 shows an automatic beverage maker for example for making tea which includes a water receptacle 10 having an aperture 11 therein to receive a heating unit generally indicated by the reference numeral 12 and the details of the head of which are shown in FIG. 2. The container 10 has a normal handle 13, a spout 14 and a lid 15. Within the lid is formed a tea compartment 17 within which tea leaves, tea bags or the like can be placed prior to the boiling of water and retained in the compartment by a pivoted plate 18 which, as will be described, is arranged to be released when the water boils to permit the tea leaves or tea bags to be dispensed into the water.

Referring now to FIG. 2 it will be seen that the heating unit 12 incorporates a conventionally sheathed heating element 19 within the water container 10. The element 19 is mounted on a casting 20 which has a screw-threaded sleeve portion 21 extending through the aperture 11. The casting also has a flange 22 which abuts against the inside surface of the container wall around the periphery of the aperture 11. A ring 23 is screw-threaded on to the external surface of the sleeve 21 to clamp the casting to the container wall. A suitable seal 26 is incorporated between the ring 23 and the container wall.

Forming an integral part of the heating unit 12 and extending outwards from the casting 20 is a box-like structure 27 which forms a chamber 28. The casting and the structure 27, with its contents in effect form a head to the element. A screw 29 connects the casting 20 to an earth terminal 30 which extends parallel to a pair of mains terminals 31, only one of which is shown, the terminals being surrounded and protected by a shroud 32 formed of insulating material.

Mounted within the chamber 28 are contacts 25 which are in series with the heating element 19 and which, in their closed position, shown in FIG. 2, permit current to flow through the heating element 19 when a suitable plug is attached to the terminals 31 in a conventional manner.

A magnet 35 is mounted to pivot about a hinge pin 36 within the chamber 28 between the full line position shown and the chain dotted line position. In the full line position the magnet is attracted to a horizontal section 37 of a ferrite element 38. The ferrite element has a vertical section 39 secured to the wall of the casting 20 immediately behind the position where a section 40 of the heating element 19 is welded to the casting 20 by a weld 41. In this way the ferrite element 38 is in close thermal heating conducting relationship with the section 40 of the heating element 19.

A space 42 above the horizontal section 37 of the ferrite element 38 is placed in communication with the interior of the container 10 by a vapor tube 44. It will be seen that the upper end 45 of this tube extends well above the normal liquid filling level in the beverage maker. The tube 44 serves to conduct steam on boiling to fill the space 42 above the ferrite element thereby heating it to render it non-magnetic and to permit the magnet 35 to drop under the force of gravity alone to its chain dotted line position. In its chain dotted line position the magnet attracts an armature 48 secured to one of the contacts 25 so separating the contacts 25 and thereby disconnecting the heating element from the supply.

It will also be appreciated that in the event that no water is placed in the beverage maker or if its water level should drop below the region of the weld 41 heat will be conducted direct to the ferrite element, instead of being conducted away therefrom by the water, to bring the ferrite element to its Curie temperature and thereby permit the magnet to drop by gravity to disconnect the heating element from the supply before damage is sustained. It will therefore be appreciated that the construction is such that when there is water covering the whole of the heating element the amount of heat which reaches the horizontal section 37 of the ferrite element by direct conduction from the water or the heating element is not sufficient to raise its temperature to above its Curie temperature in the time which it takes the water in the kettle to boil.

When the magnet falls it also moves upwardly a rod 50 to which it is connected by a linkage 51. The upper end of the rod 50 engages the underside of one arm of a bell crank lever 52 pivoted at 53, the other arm of which has a hooked end 54 normally retaining the plate 18 in a latched position. Upward travel of the rod 50 on movement of the magnet rotates the lever 52 anticlockwise in order to release the plate 18 and dispense tea from the compartment 17 into the boiling water below it.

The magnet 35 is reset and disconnected from the armature 48 by pressing down on the top of the rod 50 with the lid 15 removed. With this embodiment this operation can only be performed if the ferrite element has cooled to a temperature below its Curie temperature to permit the magnet to be attracted again to the ferrite element.

The travel of the rod 50 is limited so that the magnet 35 will not rotate beyond its chain dotted line position shown in FIG. 2. Any surplus water, steam or condensate which tends to accumulate within the head of the heating unit can escape through a channel 55.

Figure 3:
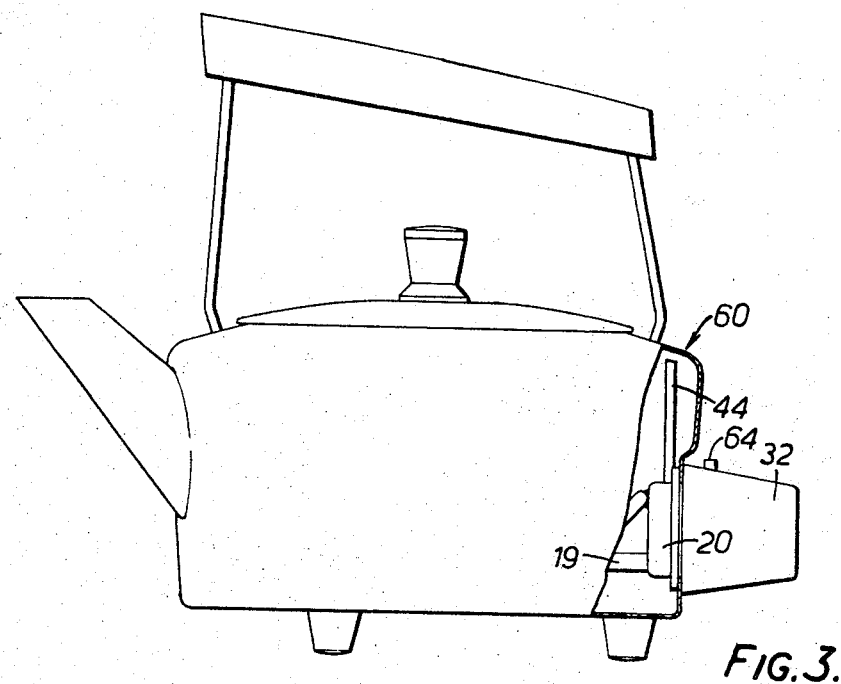
FIG. 3 illustrates a kettle incorporating an alternative form of heating unit according to the present invention.
Figure 4:
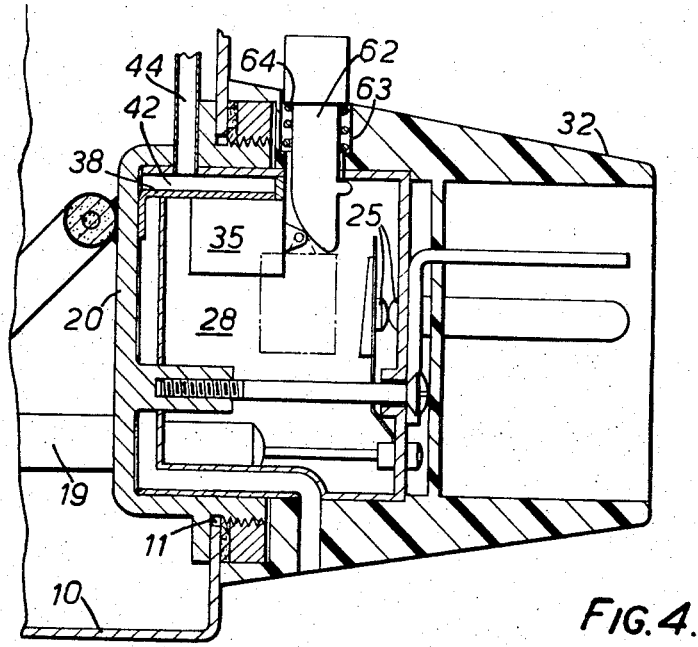
FIG. 4 is a sectional side elevation on an enlarged scale of the head of the heating element and its control mechanism for the kettle of FIG. 3.

A second embodiment as applied to a kettle is shown in FIG. 3 and FIG. 4. The kettle body 60 is of conventional form. As in the previous embodiment a single aperture 11 is formed in the wall of the container 10 of the kettle to receive a casting 20 substantially the same as that of the first embodiment. The chamber 28 formed within the casting again has a vapor tube 44 communicating with a space 42 above the ferrite element 38 in order to heat this element when the water boils within the kettle. In this way the ferrite element 38 is sensitive to the boiling water in the kettle but it also acts, as in the first embodiment, as a heat sensitive element which is sensitive to a boil-dry condition. In either case a magnet 35 can move between the two positions shown to disconnect contacts 25 in series with the heating element 19. In contrast to the embodiment of FIGS. 1 and 2 there is of course no requirement for the dispensing of soluble or infusable material upon the boiling of the water but a plunger 62 as incorporated for resetting the magnet 35 when required. As shown in FIG. 4 the plunger 62 is mounted within a slot 63 in the shroud 32 and is spring biassed outwards by means of a small coil spring 64.

Both the devices of FIGS. 1 and 2 therefore provide a steam control to arrest the heating of water at its boiling point together with a control device which will safeguard the life of the heating element if it at any time is not totally immersed. In both cases the contacts have to be reset manually which avoids undue stress on the heating element which occurs in some known devices in which for example a bi-metal is arranged to switch current on and off for as long as the device is connected to the mains. The devices illustrated in FIGS. 1 to 4 have the considerable advantage as regards ease of manufacture in that the two separate control functions are effected by a single temperature sensitive element. Furthermore the entire control mechanism with the exception of the resetting members can be formed as part of the element head and can be assembled into the beverage maker, or kettle, as the case may be by downward insertion through the top opening of the appliance as is done normally with heating elements of a conventional type. This does not therefore require any additional apertures in the appliance body beyond the single aperture required for the heating unit body.

Figure 5:
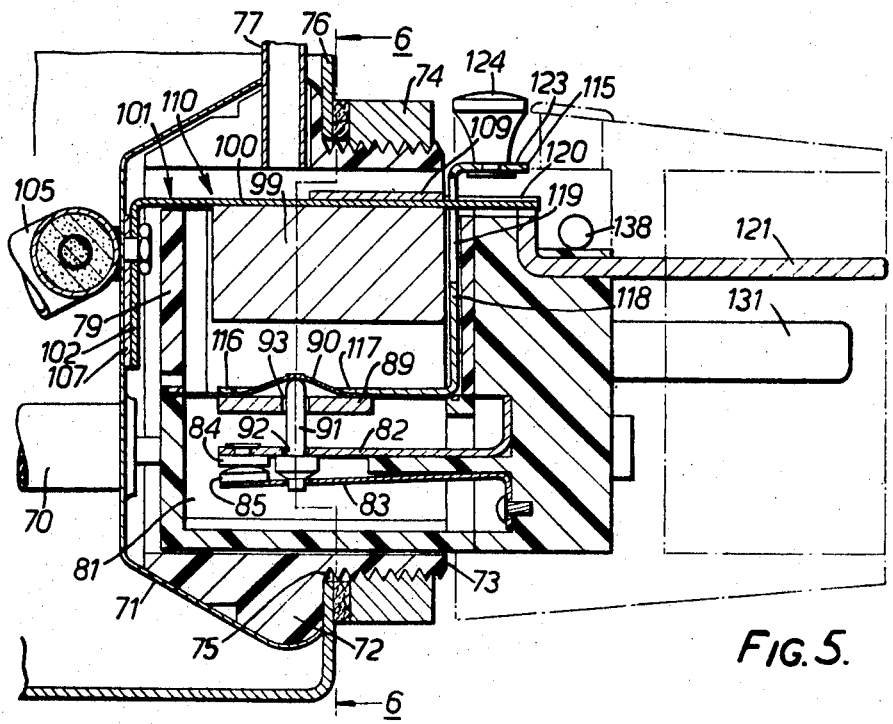
FIG. 5 is a sectional side elevation of the head of a heating unit for a kettle showing an alternative embodiment of the present invention.
Figure 6:
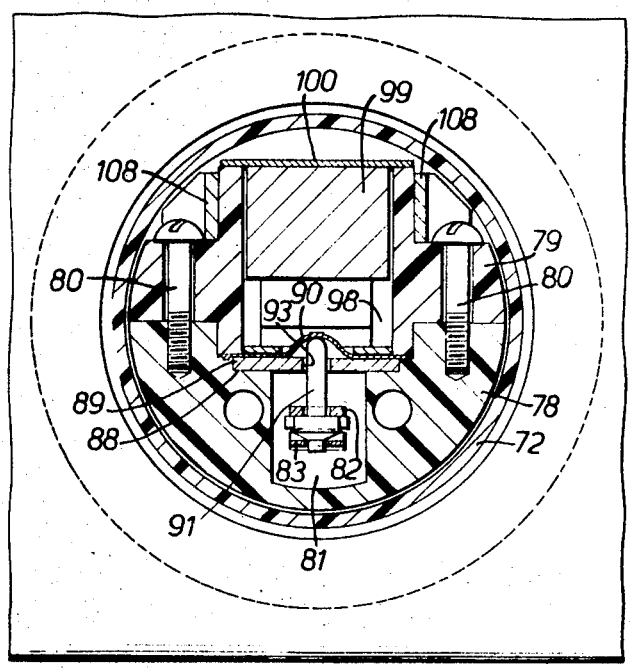
FIG. 6 is a sectional elevation on the line 6—6 of FIG. 5.
Figure 7:
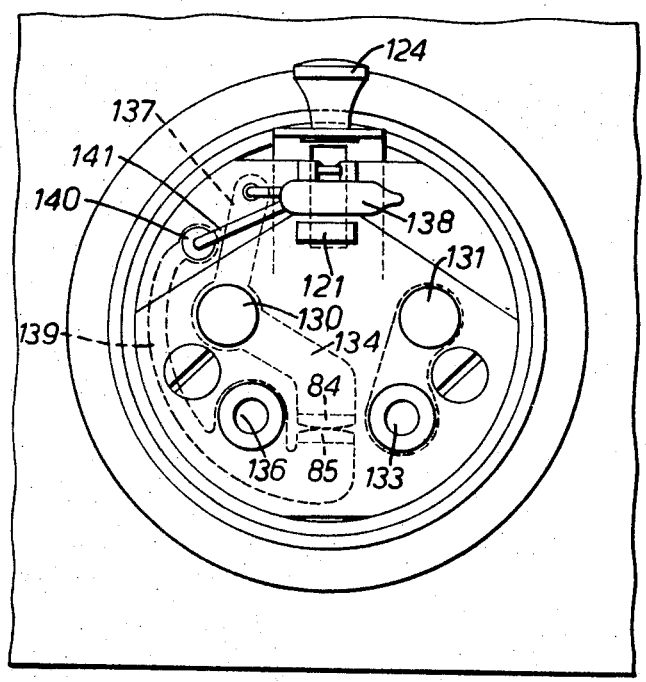
FIG. 7 is a rear view of the heating unit of FIGS. 5 and 6.

FIGS. 5 to 7 illustrate a third embodiment, again as applied to a kettle, and, like the first two embodiments, incorporating a control mechanism as an integral part of the head of the element which has the dual function of switching off the electrical supply to the heating element by the operation of vapor on boiling, or alternatively by direct conduction to act as a cut out if the element is not fully immersed.

In FIG. 5 the heating element 70 is secured to a pressing 71 within which is mounted a plastics housing generally indicated at 72. This is of annular form and has a sleeve portion 73 which is externally screw-threaded to receive a clamping ring 74 in order to secure the heating unit within an aperture 75 in the container wall 76. A vapor tube 77 extends through the plastics housing 72 the upper end of this tube, as in the previous embodiments, extending to above the normal water level in the kettle.

Mounted within the housing 72 is a contact housing 78 surmounted by a magnet housing 79 the two housings 78 and 79 being secured together by a pair of screws 80. Means, not shown, is provided to ensure an annular gap between the plastics housing 72 and the parts 78 and 79 for the escape of condensate. The contact housing 78 has a central recess 81, which is vented to atmosphere, and therein within which a pair of contact arms 82 and 83 are mounted, the former being a rigid contact arm and the latter a spring contact arm. The contact arms carry electrical contacts 84 and 85 respectively which are normally retained in a closed position as shown in FIG. 5 by the spring contact arm 83.

The contact housing 78, above the recess 81, has a shoulder 88 upon which a steel plate 89 rests. The plate 89 is clamped in position by the screws 80 with the interposition of a resilient diaphragm 90 which seals the recess 81 from ingress of moisture from above. The spring contact arm 83 carries an upwardly extending pin 91 passing through an aperture 92 in the upper contact arm 82 and also through an aperture 93 in the steel plate 89. The top of the pin 91 forces the diaphragm 90 into the domed position shown in FIGS. 5 and 6.

Above the diaphragm 90 the magnet housing 79 defines a guide 98 for a reciprocable magnet 99 which is normally held attracted to a horizontal section 100 of a ferrite element 101. The ferrite element, as in the previous two embodiments, has a vertical portion 102 in close thermal heat conducting relationship with the pressing 71 in the region where a portion 105 of the heating element 70 is secured to the pressing. Between the interior of the pressing 71 and the vertical arm 102 of the ferrite element an aluminum box-like structure 107 is secured. This structure includes rearward extending side walls 108 one on each side of the magnet housing as shown in FIG. 6 and a horizontal wall 109 as shown in FIG. 5. The horizontal wall 109 is cut away to provide an aperture 100 immediately below the lower end of the vapor tube 77 to permit vapor passing down the tube to contact the ferrite element section 100. In this manner, as in previous embodiments, when water boils within the kettle the ferrite element is heated to render it non-magnetic. This permits the magnet 99 to drop by gravity. In moving to this lower position the magnet will not only act on the pin 91 directly but will be positively attracted to the steel plate 89 so that it can be said that the separation of the contacts 84 and 85 is caused at least partially by a magnetic attraction between the magnet and the steel plate 89.

A generally S-shaped lifter member 115 is provided for manually restoring the magnet to its uppermost position when required. For this purpose the lifter member 115 has a horizontal part 116 normally lying on the upper side of the diaphragm 90 but having an aperture 117 to permit depression of the pin 91. The lifter member also has a vertical part 118 extending upwards to the side of the magnet 99, this part having an aperture 119 through which a rearwardly extending end 120 of the ferrite element extends to be secured to an earth pin 121. An upper horizontal part 123 of the lifter member 115 carries a lifting knob 124, which is removable for assembly of the heating unit into the appliance.

FIG. 7 shows the earth terminal 121 and the two further mains terminals 130 and 131 the latter being connected direct to one end 133 of the element. The terminal 130 is connected via a conductor 134 to the contact 84 and the other contact 85 is connected to the second end 136 of the element. A further conductor 137 extends from the terminal 130 and is connected to a neon lamp 138. Another conductor 139 extends, via a resistor 140, and a lead 141 to the other side of the neon lamp 138.

Figure 8:
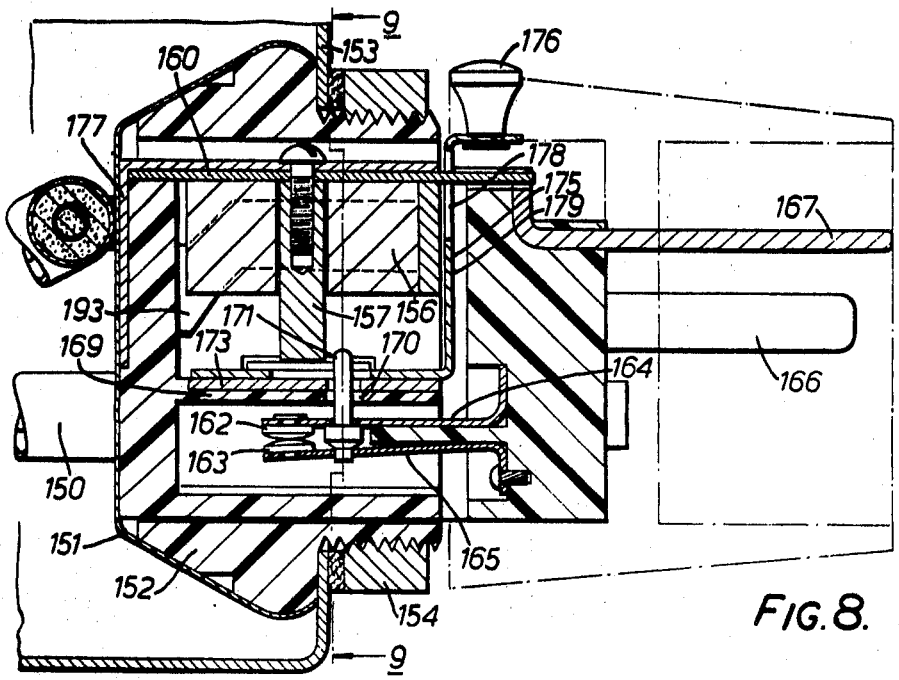
FIG. 8 is a sectional side elevation of the head of an alternative form of heating unit according to the present invention.

Referring now to FIGS. 8 to 12, these illustrate a further embodiment in which the control device is responsive to boiling water in a kettle or an unimmersed element in the kettle, in each case by conduction. The vapor tubes of the previous embodiments are accordingly not required. In this embodiment the heating element 150 is secured to a pressing 151 in a similar manner to the construction of FIG. 5. The pressing 151 contains a plastics moulding 152 secured to the wall 153 of the kettle by a ring 154. Within the moulding 152 a magnet 156 is mounted for up and down movement on a guide post 157. A horizontal ferrite element 160 is provided which, when below its Curie temperature, can retain the magnet 156 in its uppermost position as shown in FIG. 8 at which time contacts 162 and 163, mounted respectively on a fixed arm 164 and a spring arm 165, are in a closed position to place the heating element 150 in circuit with mains terminals 166 one of which is shown. The ferrite element 160 is connected to an earth terminal 167. The moulding 152 has a platform 169 extending above the contacts but provided with an aperture 170 through which a pin 171, carried by the spring contact arm 165, extends upwardly so as to be engaged by the magnet drops when the ferrite element rises above its Curie temperature. As in the previous embodiment an apertured steel plate 173 is incorporated above the platform 169 to attract the magnet 156 to its lowermost position to maintain the contacts open. A lifter member 175 is incorporated having a knob 176 the member 175 being substantially the same in function as that of the embodiment of FIGS. 5 and 6. In this case however, the aperture 178 in the vertical arm 179 of the lifter member is of such a length that it cannot by itself lift the magnet to its uppermost position of FIG. 8 but only to a spaced position shown in FIG. 11. If the ferrite element 160 is below its Curie temperature, attraction between the ferrite element and the magnet will cause it to jump away from the lifter and be retained in its uppermost position, shown in FIG. 9.

Accordingly in normal operation, once the kettle has been filled with water, and the ferrite element lifted by the lifter member 175, the magnet will jump into its uppermost position in contact with the ferrite element and the contacts 162 and 163 will remain closed so that heating can commence. An aluminum heat transfer member 177 conveys heat from the wall of the pressing 151 to the ferrite element as the water is heated so that the ferrite element reaches its Curie temperature at the same time the water boils within the kettle. This will cause the ferrite element to become de-magnetized and the magnet 156 will therefore drop to engage the pin 171, and be attracted to the steel plate 173, this combined operation opening, and maintaining open, the contacts 162 and 163 to de-energize the heating element.

As is usually practiced when making tea, the kettle tends to be left whilst it initially boils. At the moment the kettle is required for the making of the tea it will need to be brought to the boil again but at this time with this embodiment it is possible that the ferrite element 160 will not have cooled down sufficiently for it to attract the magnet 156 if this is lifted by the lifter member 175.

Therefore, according to another feature of this invention, an auxiliary mechanism is provided, which will be described with reference to FIGS. 9 to 12, which can be used to retain the magnet in an intermediate position to permit the contacts to be opened.

Figure 12:
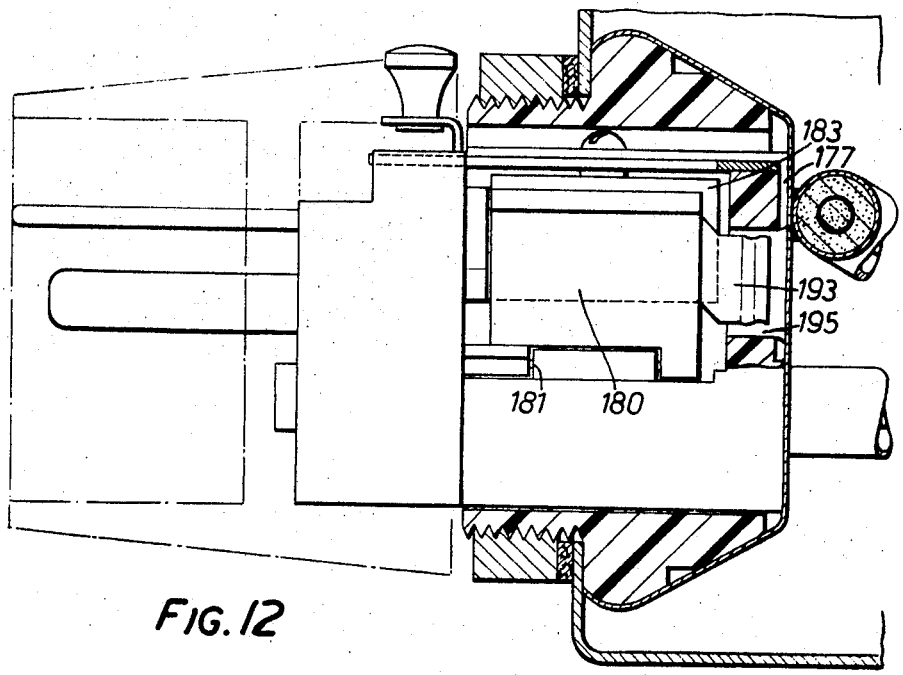
FIG. 12 is a sectional side elevation of the embodiment of FIGS. 8 to 11 as viewed from the opposite side to that of FIG. 8.

This additional function is obtained by means of a reset lever 180 pivoted at its lower end about a horizontal axis 181. The lever has, on its surface facing the magnet 156, a ledge 182 upon which is mounted a secondary ferrite element 183, and a small steel plate 184. Sandwiched between the secondary ferrite element 183 and the plate 184 is a thin heat transfer strip 193 formed of beryllium copper. As shown in FIG. 12 the right-hand or free end of the strip 193 projects beyond the end of the lever and the ferrite element 183 and has a spring end portion adapted to engage a heat transfer flange 195 projecting rearwardly from the aluminum heat transfer member 177. This causes the secondary ferrite element 183 to receive heat by conduction, in the same way as the main ferrite element 160, when the lever 180 is in its vertical position of FIG. 11.

Figure 9:
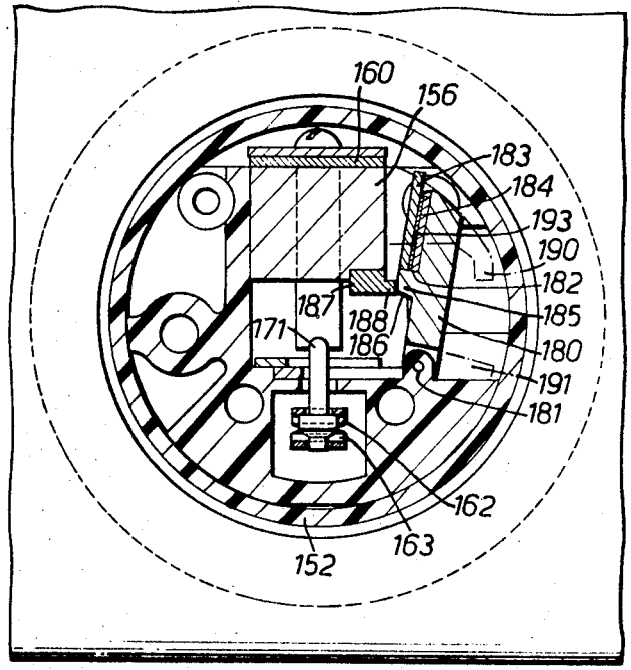
FIG. 9 is a sectional elevation on the line 9—9 of FIG. 8 showing parts of the control mechanism in one operative position with the heating element contacts closed.
Figure 10:
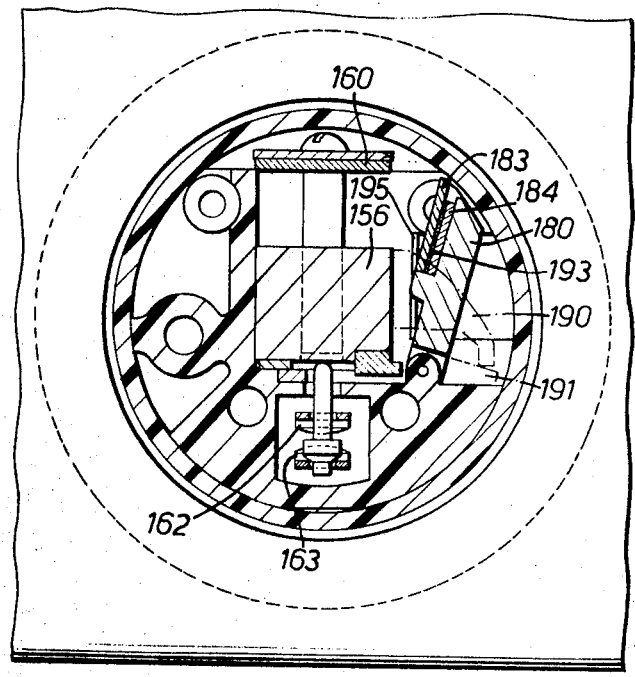
FIG. 10 is a view similar to that of FIG. 9 with the parts of the control mechanism in a further position with the contacts of the heating element open.

In the normal way however, the lever remains in its inclined position of FIGS. 9 and 10 during initial operation of the heating element by means of the main ferrite 160 and the magnet 156. Accordingly when the main ferrite 160 is heated to permit the magnet 156 to fall to its FIG. 10 position, the contacts 162 and 163 are opened without the lever 180 being drawn inwards by the magnet. The lever is maintained in its inclined position of FIG. 10 when the magnet is in the lowered position by means of a lateral arm 190 carried by the magnet which engages a further arm 191 integral with the reset lever 180. If however, it is required to bring the water in the kettle back to its boiling point when the main ferrite element 160 is not cool enough to attract the magnet 156 back to it, when the magnet is lifted to the FIG. 11 position, the secondary ferrite element 183, assisted to some extent by the small steel plate 184, will come within the attractive field of the magnet. This draws the lever 180 anti-clockwise to the FIG. 11 position. This will retain the magnet in the intermediate position shown in FIG. 11 at which time the contacts 162 and 163 are again closed to permit reheating of the water to continue. As has been mentioned, in the vertical position of the lever 180 the heat transfer strip 193 will engage the heat transfer flange 195 so that heat will be transferred to the secondary ferrite 183 eventually to render this non-magnetic on boiling of the water (or if the element is not fully immersed) whereupon the magnet 156 can fall to reopen the contacts. It is to be stressed that the small steel plate 184 is not alone enough to retain the magnet and lever 180 in the position shown in FIG. 11.

The ledge 182 is formed on a projection 185 of the lever, the lower surface of the projection forming a cam 186 to cooperate with a lateral projection 188 on an abutment 187 carried by the magnet 156. Accordingly it is possible for the magnet 156 to rise from its FIG. 11 position into engagement with the main ferrite element 160 (assuming this is below its Curie temperature), the lever 180 being tilted outwards by the lateral projection 188 cooperating with the cam 186.

This embodiment therefore provides a method whereby the kettle can be readily brought back to the boil even if it has very recently been switched off by disconnection of the magnet 156 from the main ferrite element 160.

Figure 13:
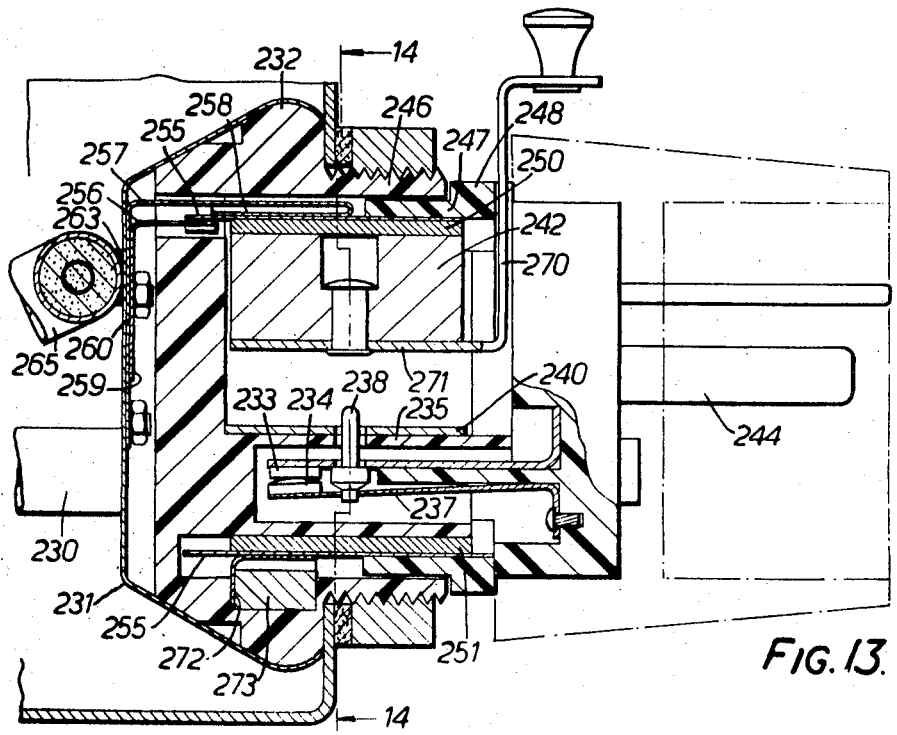
FIG. 13 is a sectional side elevation of the head of a heating element showing a further embodiment according to the invention.
Figure 14:
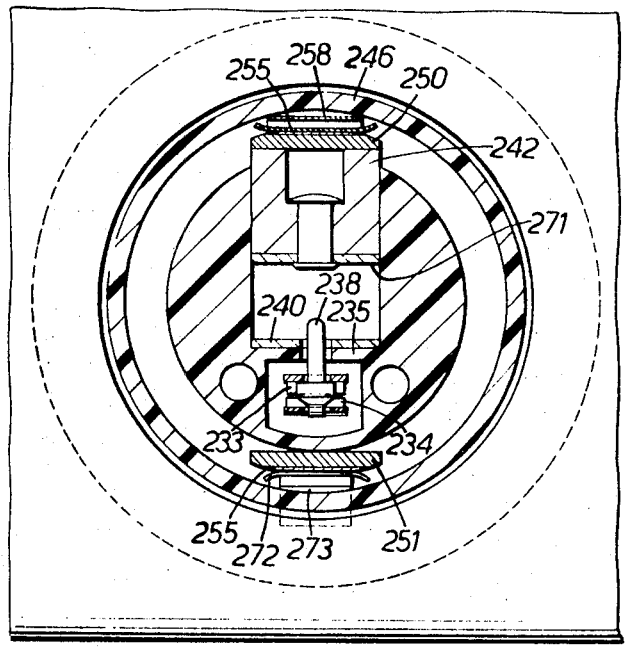
FIG. 14 is a sectional elevation on the line 14—14 of FIG. 13.

Yet another embodiment is illustrated in FIGS. 13 and 14 which includes a heating element 230 secured to a pressing 231 within which is a plastics housing 232 containing electrical contacts 233 and 234. As in the previous embodiment these are disposed below a platform 235 and the lower contact 234 is mounted on a spring arm 237 carrying a pin 238. A steel plate 240 is secured to the platform 235. A magnet 242 is mounted within the moulding 232 for up and down movement. In the upper position, shown in FIGS. 13 and 14, the contacts 233 and 234 are closed to place the element 230 in circuit with the mains terminals 244. Mounted to rotate within a sleeve portion 246 of the moulding 232 is a rotary sleeve 247 having an outwardly extending flange 248 which can be gripped for manual rotational purposes. Secured diametrically opposite one another within the sleeve 247 are a pair of ferrite elements 250 and 251. Means, not shown, is provided to locate the sleeve in one of two rotary positions with one or other of the ferrite elements 250 and 251 uppermost. In FIGS. 13 and 14 the ferrite element 250 is uppermost and is shown with the magnet 242 attracted thereto. Each ferrite element has secured to it a beryllium-copper leaf 255 which overhangs the left-hand end of its ferrite element for engagement with an L-shaped heat transfer leaf 256. A further heat transfer leaf 257 is provided with a return loop 258 for contact with the outer face of the beryllium-copper leaf 255. The heat transfer leaves 256 and 257, made of material such as phosphor bronze, have vertical arms 259 and 260 respectively which are secured to the pressing 231 immediately behind a weld 263 which secures a portion 265 of the heating element to the pressing. In this way the heat transfer leaves 256 and 257 conduct heat to the currently uppermost ferrite element both from heated water within the kettle to cause the ferrite element to reach its Curie temperature when the water boils, or alternatively, if the water level is below the portion 265 of the heating element, heat from the element will be conducted via the heat transfer leaves 256 and 257 to the ferrite element so that this ferrite element also acts as a cut out device to safeguard the heating element if this is not fully immersed. In either case upon the ferrite element reaching its Curie temperature it will become substantially or completely non-magnetic permitting the magnet 242 to drop by gravity into engagement with the pin 238 and at the same time be attracted to the steel plate 240 to disconnect the contacts 233 and 234 to open the heater element circuit.

As has been mentioned in connection with other embodiments it is in many cases desirable that the kettle should be capable of being quickly and readily brought back to the boil and in this embodiment the ferrite element 250, being sensitive, by conduction, to water temperature, if in the uppermost position will remain above its Curie temperature for some time and, therefore, lifting of the magnet 242 by means of a lifter member 270, the horizontal arm 271 of which is secured to the underside of the magnet, will not cause the magnet to be attracted to the ferrite element.

This embodiment overcomes this difficulty by the provision of the second ferrite element 251 which can be rotated by means of the sleeve 247 into the upper position. This ferrite element will have previously been maintained cool enough to be below its Curie temperature so that the magnet 242 can then be lifted and attracted into contact with the then upper ferrite element 251, the lifter member remaining elevated to provide a visual indication that the contacts 233 and 234 are closed until the kettle reboils whereupon the heat transfer leaves 256 and 257 will conduct heat to the second ferrite element 251 again to permit the magnet 242 to drop and disconnect the heating element.

In its now lower position the ferrite element 250 will have its beryllium-copper leaf 255 in contact with an L-shaped heat conducting member 272 secured to a heat sink 273. In this way, when a hot ferrite element is rotated to the lower position it will be readily cooled to below its Curie temperature and, therefore, if the ferrite element is required again for another boiling operation of the kettle, it will be speedily available for this purpose. It will be appreciated that whilst this construction shows two ferrite elements which can be alternately brought into operative relationship with the magnet 242, more than two such ferrite elements, secured to a suitable member such as the sleeve 247 can be provided. Where the heating element is to be utilized in association with an appliance at which cut out of the heating element is required at different temperatures for example in a deep fat fryer or the like, the ferrite elements can serve not only the secondary function of being ready for immediate use for reheating but can also be manufactured so that they have different Curie points in order that the heating element can be cut out automatically at different desired temperatures.

The various embodiments described all include magnets which fall by gravity away from the ferrite element when this reaches its Curie temperature, but it is within the scope of the present invention for the magnet to remain stationary and the ferrite element to move.

Furthermore, whilst arrangements have so far only been described in which contacts are in series with the heating element, it is also within the inventive ambit for the contacts which are actuated by the relative movement of the magnet and ferrite element to be closed by such movement and cause of the heating element by other means, either electrical or mechanical in nature, e.g. servo mechanism.

Figure 11:
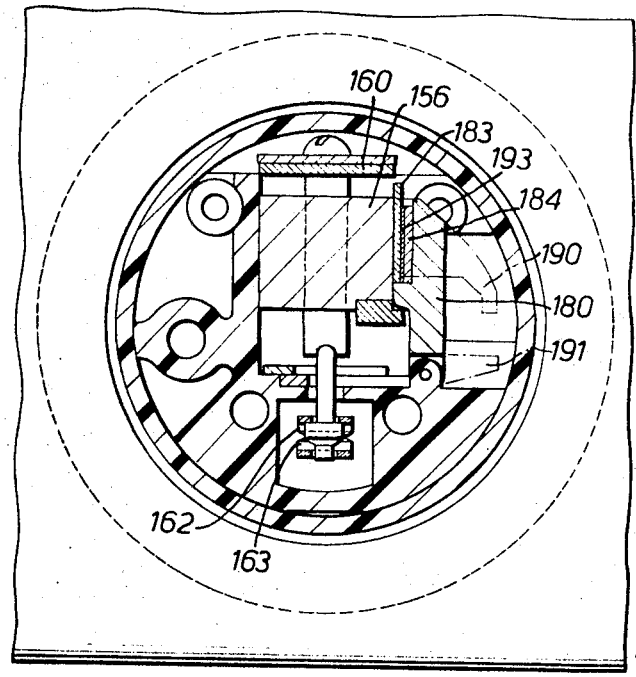
FIG. 11 is a view similar to FIGS. 9 and 10 showing an alternative "reset" position of certain of the parts of the control mechanism.

In the embodiment of FIGS. 8 to 12 an additional reset could be provided by providing two, similar, levers 180, one on each side of the magnet 156 and linked together so that either, but not both, could be in the operative position of FIG. 11. Then, when the main ferrite 160 is too hot, two successive resetting operations could, if desired, be performed by the levers and their associated secondary ferrite elements.

I claim:

1. A liquid heating unit comprising a submersible electric sheathed heating element having a unitary head which is adapted to be secured within an aperture in a wall of a liquid container, said head having means thereon for connection to a mains supply, a control mechanism being provided within said head for moving control contacts for said heating element between closed and open positions, said control mechanism incorporating a heat sensitive ferrite element and a magnet movable between a first position adjacent said heat sensitive element and a second position in which said magnet operates said contacts with means limiting movement of said magnet between said two positions, a vapor tube connected to said head with its interior in communication with a part of said heat sensitive element within said head whereby said tube can transmit steam to said heat sensitive element from above a normal liquid level within the container when said heating element is mounted in an aperture in said container wall whereby to cause actuation of said contacts if the liquid reaches a predetermined temperature, said heat sensitive member also being in close thermal conductive relationship with at least a portion of said heating element whereby to cause actuation of said contacts if said heating element is energized and not covered by liquid.

2. A heating unit as claimed in claim 1 in which the magnet in the second position actuates the contacts at least partially in a magnetic manner.

3. A heating unit as claimed in claim 1 including a keeper to which the magnet is attracted in moving to the second position.

4. A heating unit as claimed in claim 1 in which the magnet moves in a pivotal manner.

5. A heating unit as claimed in claim 1 in which at least one part of the ferrite element abuts a portion of the head which is normally in heat conducting relationship with a liquid within the container.

6. A heating unit as claimed in claim 1 in which the chamber is subdivided by a flexible diaphragm into a first sub-chamber containing the ferrite element and the magnet, and a second sub-chamber containing the electrical contacts.

7. A heating unit as claimed in claim 1 in which the head incorporates a re-setting member adapted to be manually moved in return the magnet to its first position.

8. A vessel as claimed in claim 1 in which the vessel has a filling opening, and the heating unit, with its head and vapor tube can be assembled into or removed from the vessel via the filling opening.

9. A vessel for the boiling of liquid including a container for receiving the liquid to be heated, the container having a wall provided with a filling opening, a lid for the filling opening, and an aperture in a lower part of the container wall, a liquid heating unit mounted in sealing relationship with the aperture, the heating unit incorporating a submersible sheathed electrical heating element extending within the container adjacent the bottom thereof, the heating element extending from a unitary head a part of which extends through the aperture in the container wall, the head having within it a chamber containing control mechanism including electrical contacts normally in series with the heating element and adapted to be opened by movement of a magnet by gravity away from a ferrite element when the latter is above its Curie temperature, said magnet having a first position adjacent said ferrite element and a second position in which said magnet operates said contacts with means limiting movement of said magnet between said two positions, a vapor tube extending from a position above the normal liquid level in the container into close relationship with the ferrite element thereby to convey vapor to the ferrite element on boiling of the liquid, a part of a ferrite element being in close thermal conducting relationship with a part of the heating element, whereby the ferrite element will be heated to above its Curie temperature on the one hand by vapor from the liquid when it boils and on the other hand by heat conduction from the element if a part thereof is not fully immersed in liquid within the container.

10. A liquid heating unit comprising a substantially closed vessel, a submersible sheathed electrical heating element in said vessel, input terminals for connecting the unit to a source of electrical supply, a pair of normally closed contacts electrically connected in series with the heating element and the input terminals, and means for opening the contacts if the heating element is not submerged in a liquid or if the liquid attains a predetermined temperature, said means comprising a ferrite element arranged on the one hand in thermal conductive relationship with the electric heating element and on the other hand so as to be heated by steam produced when the liquid attains the predetermined temperature, a vapor tube extending from above the normal liquid level in said vessel to adjacent the said ferrite element, and a permanent magnet movable at least partially by the influence of gravity from a first position in which it is supported by magnetic attraction by the ferrite element while its temperature is below its Curie point, to a second extreme position in which it operates to open the contacts, and means limiting movement of said magnet between said two extreme positions.

* * * * *